(12) United States Patent
Frijns

(10) Patent No.: US 6,425,709 B1
(45) Date of Patent: Jul. 30, 2002

(54) LINE UP OF PIPES OR PIPE COMPONENTS

(75) Inventor: Tom Laurent Hubert Frijns, Den Haag (NL)

(73) Assignee: Heerema Marine Contractors Nederland B.V. (NL)

( * ) Notice: Subject to any disclaimer, the term of this patent is extended or adjusted under 35 U.S.C. 154(b) by 0 days.

(21) Appl. No.: 09/838,460

(22) Filed: Apr. 18, 2001

(30) Foreign Application Priority Data

Apr. 20, 2000 (NL) .............................................. 1014998

(51) Int. Cl.$^7$ .................................................. F16L 1/12
(52) U.S. Cl. ...................... 405/170; 405/169; 405/166; 405/158; 414/746.5; 414/745.4; 414/910; 228/49.1; 228/49.2; 228/49.3
(58) Field of Search ................................ 405/169, 170, 405/158, 166, 165; 228/104, 48, 49.1, 49.2, 49.3; 414/746.5, 910, 745.4

(56) References Cited

U.S. PATENT DOCUMENTS

| 2,696,835 A | | 12/1954 | Kaiser | |
|---|---|---|---|---|
| 3,724,224 A | * | 4/1973 | Matthews, Jr. | .............. 138/113 |
| 5,033,907 A | * | 7/1991 | O'Donnell et al. | ......... 166/341 |
| 6,142,359 A | | 11/2000 | Corbishley et al. | |
| 6,179,523 B1 | * | 1/2001 | Langner et al. | ............. 405/158 |

FOREIGN PATENT DOCUMENTS

| GB | 2 322 423 B | 8/1998 |
|---|---|---|
| GB | 2 335 722 A | 9/1999 |
| GB | 2 336 191 A | 10/1999 |
| GB | 2 339 251 A | 1/2000 |
| WO | WO 99 08828 A | 2/1999 |
| WO | WO00/05525 | 2/2000 |

OTHER PUBLICATIONS

Harry Van Der Heijden, and Peter Butler, "Installation of an Internally Clad Pipeline Using the J–Lay Method," OTC 7016, Offshore Technology Conference, p. 8, (Jul. 18, 1992).
S.P. Springmann and C.L. Herbert, McDermott Marine Construction, "Deepwater Pipelaying Operations and Techniques Utilizing J–Lay Methods," OTC 7559, Offshore Technology Conference, p. 10, ( Jul. 18, 1994).

* cited by examiner

Primary Examiner—Heather Shackelford
Assistant Examiner—Katherine Mitchell
(74) Attorney, Agent, or Firm—Fulwider Patton Lee & Utecht

(57) ABSTRACT

A line up and connection installation comprises an elongated pipe receiving structure, a line up device for lining up double-walled pipes or pipe components and a connection station for connecting the lined up pipes or pipe components. The line up device has at least two gripper means. The gripper means are each movable in translation in a plane which lies substantially perpendicular to the axial direction of the pipe receiving structure. At least one of the gripper means is movable in the axial direction of the pipe receiving structure. The line up device positions a first pipe or component in such a manner with respect to a second pipe or component that they can be connected to one another at their ends in a connection station.

11 Claims, 8 Drawing Sheets

LINE UP OF PIPES OR PIPE COMPONENTS

FIELD OF THE INVENTION

The present invention relates to an installation provided with a device for lining up pipes or pipe components, such as for example T-pieces and the like. The line up device ensures that one end of a pipe or component is positioned in such a manner with respect to a free end of a fixed pipe or component that these ends can then be connected to one another by means of a welded joint, a bolt connection or other mechanical connection, for example.

BACKGROUND OF THE INVENTION

Line up devices of the mentioned type are used in the construction of pipelines which are employed to transport petroleum or natural gas and for water injection.

A known application area is the laying of pipelines at sea from a vessel. Known methods for this purpose include the J-lay, S-lay and the Reel-lay methods, which are described in GB 2 335 722 A. The vessel is provided with an installation which comprises one or more connection stations, such as welding stations, for connecting various pipes or pipe components. The installation is also provided with a line up device in order to bring the pipes into line with one another.

A known line up device comprises two gripper means each having two movable clamping jaws which are arranged on a frame. These gripper means are positioned at a distance from one another in the axial direction of a pipe.

At the same time, the gripper means can be moved along a pipe receiving structure in the axial direction of the clamped pipe, in order to securely grip the pipe and to transport an end of this pipe to a short distance from the free end of a second, fixedly held pipe, so that a gap remains between the two ends or the ends touch one another.

In order then to line up the end of the fixedly held pipe and the first pipe with respect to one another, the clamped end of the first pipe can be moved in a plane which is perpendicular to the axial direction of the first pipe.

In a subsequent step, the clamped end of the first pipe is positioned against the end of the fixed pipe by moving the two gripper means simultaneously over a short distance in the axial direction towards the fixed pipe. Then, the two ends are welded together or are connected in some other way.

The installation which has been described is suitable for lining up and connecting single-walled pipes and pipe components. In many cases, however, it is desirable to construct double-walled pipes, i.e. "pipe-in-pipe" pipes. The inner pipe of the double-walled pipe is in many cases in the offshore industry used to transport a liquid, such as oil, or a gas or a mixture thereof. The outer pipe serves as a protective pipe against external water pressure, inter alia. A thermal insulation means may be arranged between the inner pipe and the outer pipe, in order to ensure that the medium in the inner pipe is not cooled excessively by external conditions.

The object of the invention is to provide an installation as described in the preamble which is suitable for lining up double walled pipes.

SUMMARY OF THE INVENTION

This object is achieved by at least one of the gripper means being designed to alternately securely grip an inner pipe and an outer pipe of a double-walled pipe.

In this way, the following method can be carried out. Firstly, the outer pipe of a first double-walled pipe is gripped by a first gripper means. Then, an end of the inner pipe of the first double-walled pipe which is projecting out of the outer pipe is gripped by a second gripper means. This second gripper means is then moved, bringing the inner pipe with it, in the axial direction towards the end of an inner pipe of a fixed, second double-walled pipe. In the process, the inner pipe and the outer pipe of the first double-walled pipe are displaced with respect to one another.

After the end of the inner pipe of the first double-walled pipe has been brought to a short distance from the end of the fixed inner pipe of the second double-walled pipe, the end of the inner pipe of the first double-walled pipe is ligned up by independent movement of at least one of the gripper means in a plane which is perpendicular to the axial direction of the pipes. When the inner pipes have been oriented in such a manner with respect to one another that they can be connected, the two gripper means are simultaneously moved in the axial direction, so that the inner pipes of the first and second double-walled pipes are positioned with their ends against each other. They are then connected to one another.

Next, the second gripper means releases the inner pipe of the first double-walled pipe and is displaced towards the first gripper means. If appropriate, an insulation means can then be arranged around the inner pipe.

Then, the outer pipe of the first double-walled pipe is gripped by the second gripper means and the first gripper means releases the outer pipe. The end of the outer pipe is then displaced, by means of the second gripper means, until it is close to the end of the fixed outer pipe of the second double-walled pipe.

Then, the outer pipe of the first double-walled pipe is in turn gripped by the first gripper means, after which the end of the outer pipe can be ligned up with the fixed outer pipe of the second pipe by moving the gripper means as described above. Next, the outer pipes are placed against one another as a result of the two gripper means being moved simultaneously towards second pipe by moving the gripper means as described above. Next, the outer pipes are placed against one another as a result of the two gripper means being moved simultaneously towards the second pipe, after which the ends of the outer pipes can be connected to one another.

The second gripper means is able to grip both an inner pipe and an outer pipe without it being necessary to adapt the second gripper means in order to enable pipes of different diameters to be gripped. This can be achieved by designing the gripper means as a clamp with a plurality of sets of shoes, it being possible to use one set of shoes to grip pipe diameters which lie between a specific minimum diameter and a specific maximum diameter.

In one embodiment, the gripper means may be arranged on a line up frame, in which case they can advance along the line up frame and the line up frame is attached to the main frame of the installation. The line up frame can be moved in the desired direction with respect to the main frame by means of actuators.

In another embodiment, the gripper means are arranged directly on the main frame and can move along it.

The present invention will be explained in more detail in the following detailed description of a preferred embodiment of an installation according to the invention and with reference to the drawing.

DETAILED DESCRIPTION OF THE PREFERRED EMBODIMENTS

Figure 1:
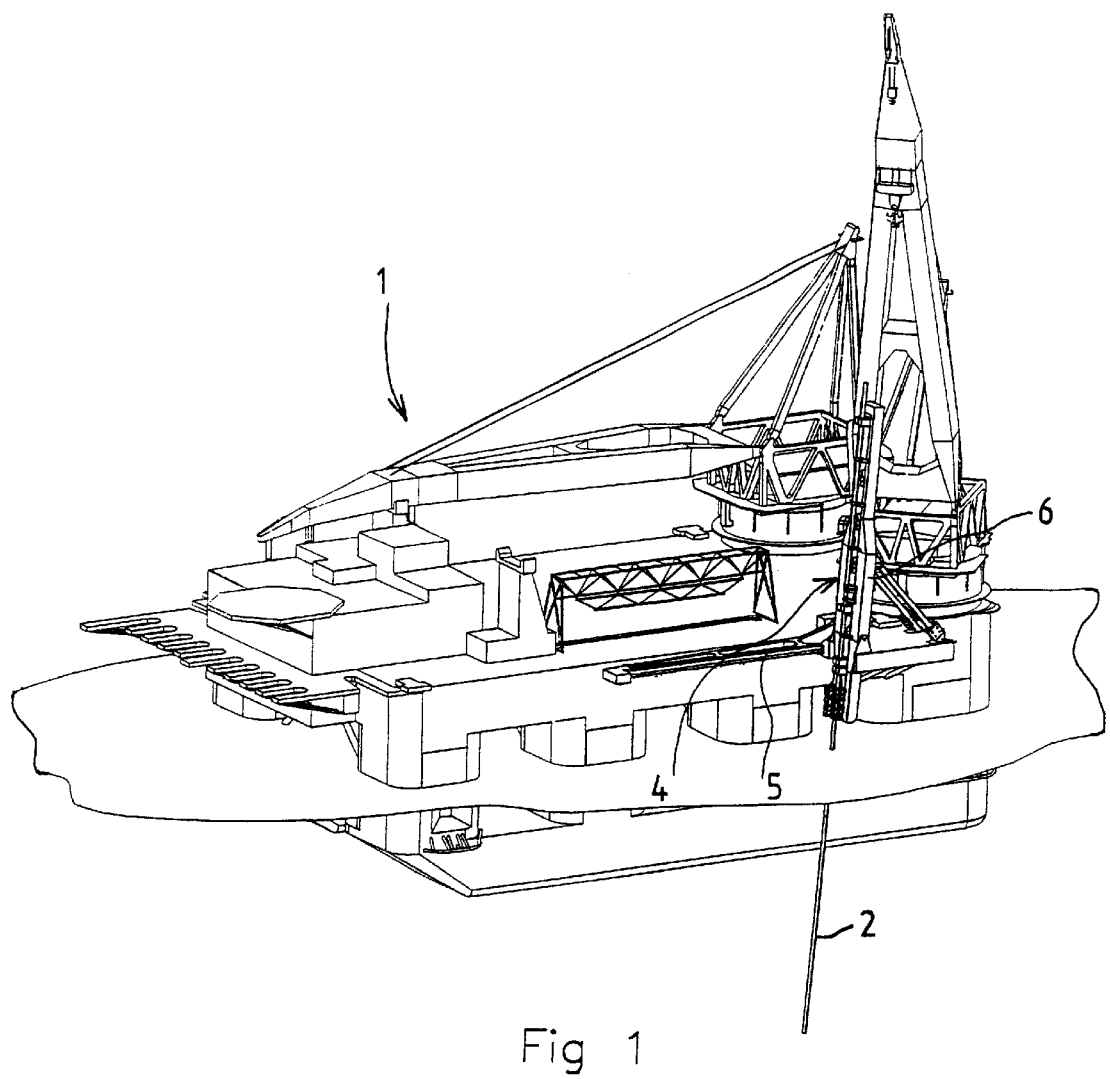
FIG. 1 shows a vessel for laying pipelines using the J-lay method.

FIG. 1 shows a vessel 1 which is laying a pipeline 2 on a seabed (not shown). The vessel 1 is provided with a pipe line up and connection installation 4 in which double-walled pipes 3, 7 are connected to the double-walled pipeline 2 hanging from the vessel 1. The installation 4 comprises a tilting device 5 and a pipe receiving structure which is embodied here as a tower structure 6 of the J-lay type.

Figure 2:
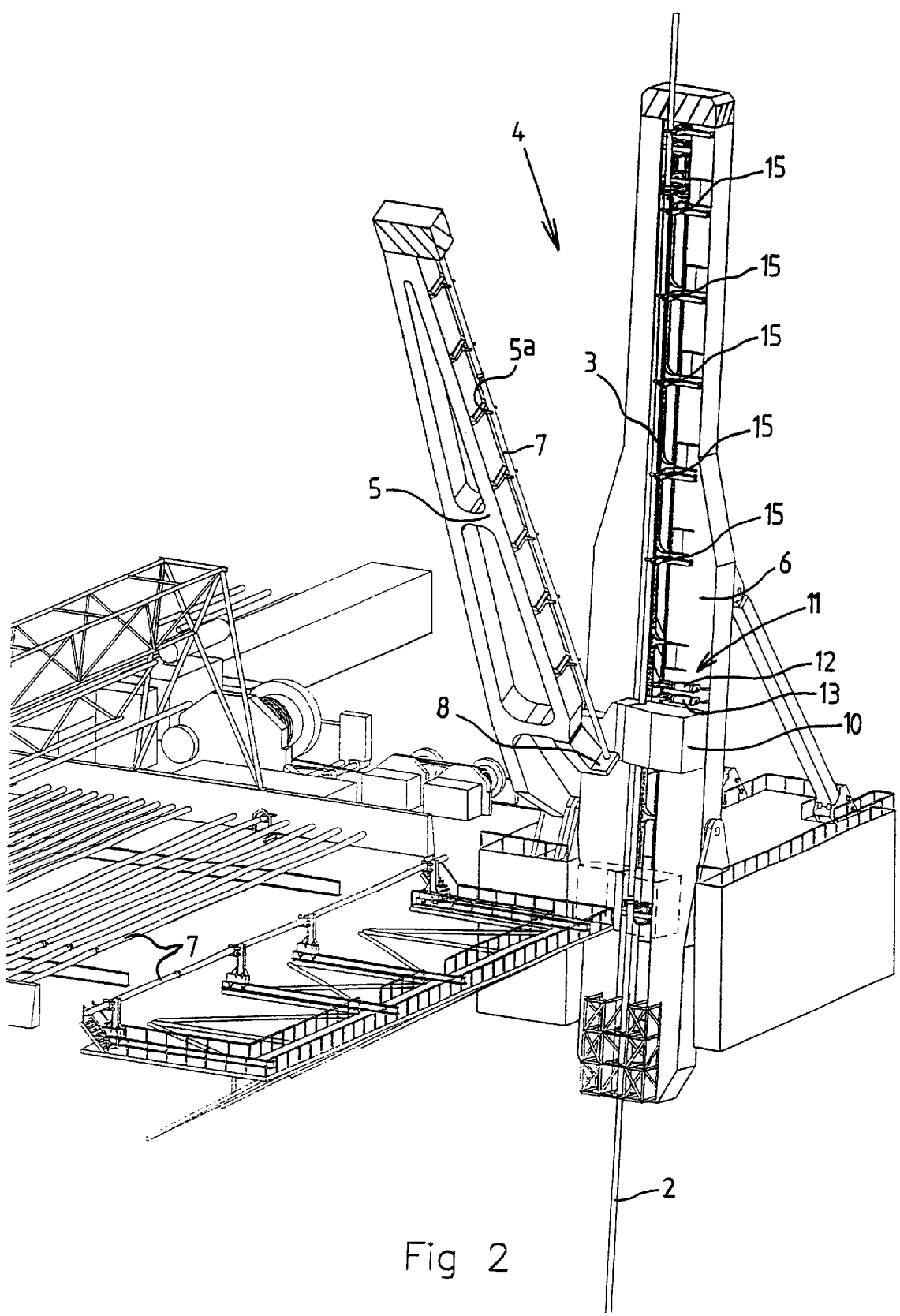
FIG. 2 shows an installation for constructing pipelines on a vessel as shown in FIG. 1, a pipe being raised by means of a tilting device.

FIG. 2 illustrates how a double-walled pipe 7 which is fixed in supports 5a is tilted off the deck of the vessel towards the J-lay tower 6 by means of the tilting device 5 and rests with its bottom end on a pipe stop 8.

On the J-lay tower 6 there is a double-walled pipe 3 which is to be connected to the pipeline 2. The pipeline 2 is being held by tensioners (not shown), so that the end of the pipeline 2 is held in a welding station 10. Above the welding station 10 there is a line up device 11 which is provided with two gripper means or clamps 12, 13. Furthermore, the double-walled pipe 3 is resting in roller clamps 15 which are arranged on the J-lay tower 6 and through which the double-walled pipe 3 can be moved in the axial direction and rotated about the axial axis.

Figure 3:
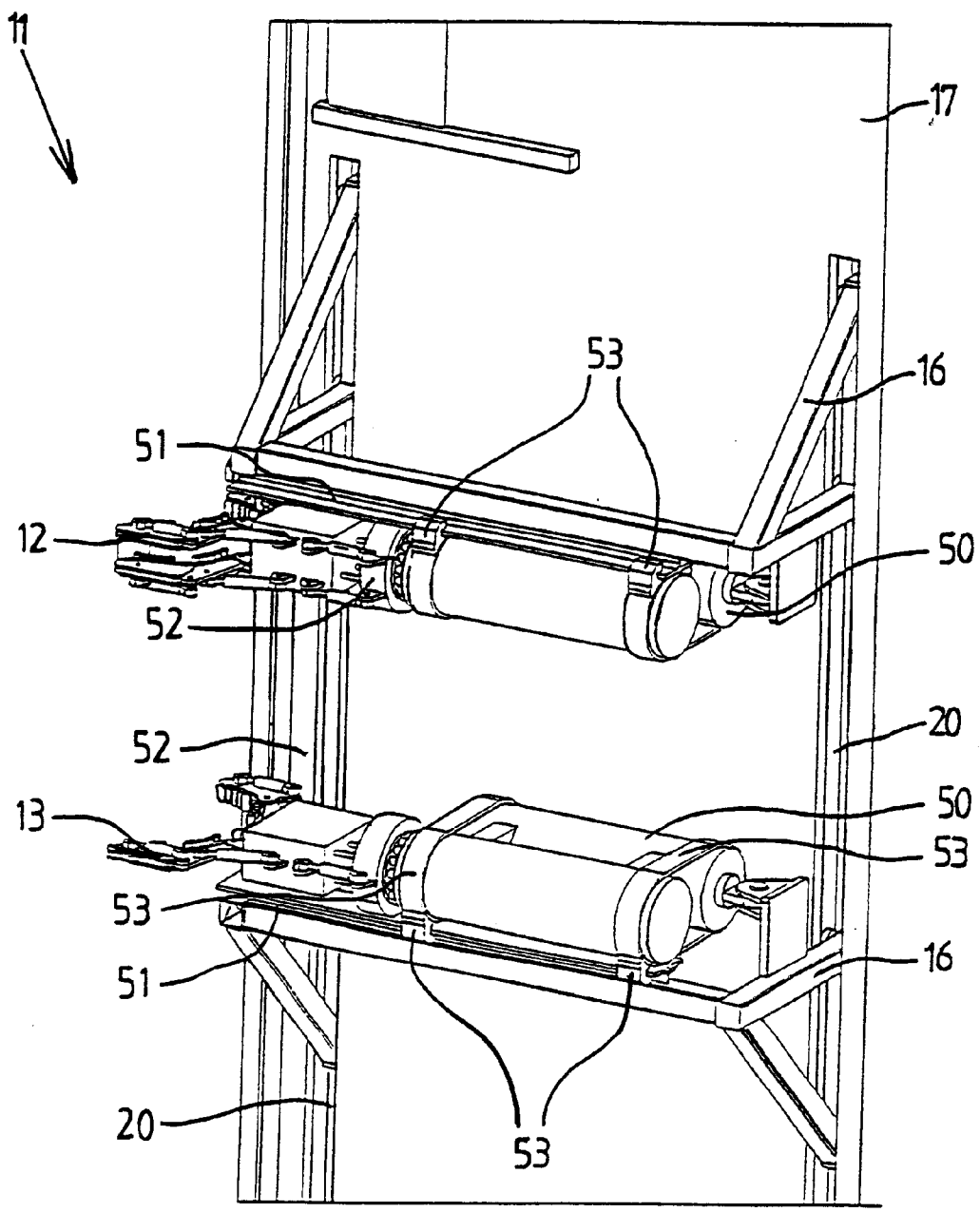
FIG. 3 illustrates one embodiment of a line up device.
Figure 4A:
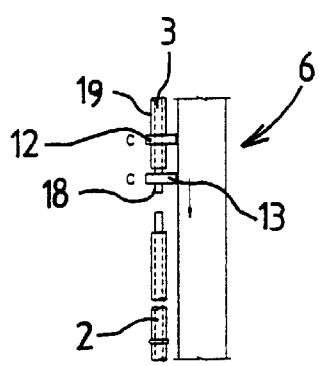
FIG. 4a diagrammatically depicts a first stage of a line up cycle.
Figure 4B:
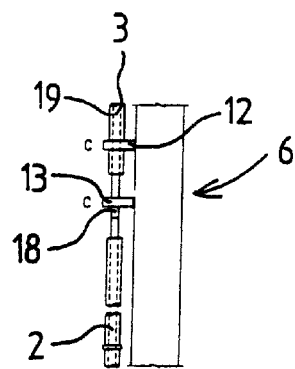
FIG. 4b diagrammatically depicts a second stage of a line up cycle.
Figure 4C:
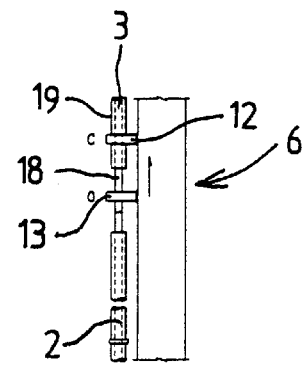
FIG. 4c diagrammatically depicts a third stage of a line up cycle.
Figure 4D:
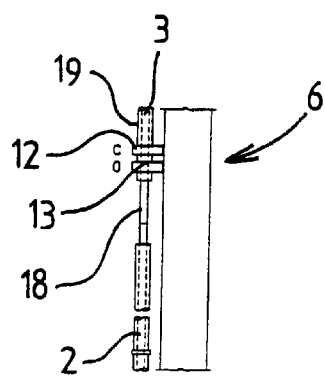
FIG. 4d diagrammatically depicts a fourth stage of a line up cycle.
Figure 4E:
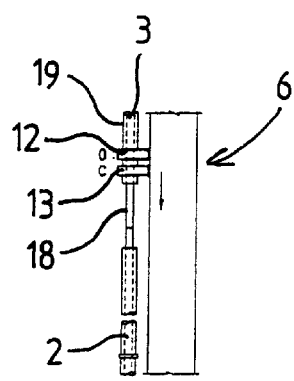
FIG. 4e diagrammatically depicts a fifth stage of a line up cycle.
Figure 4F:
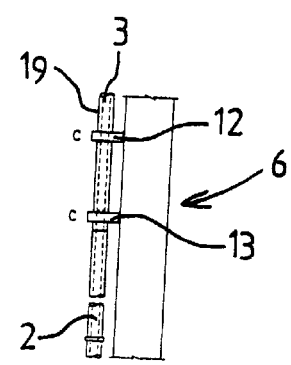
FIG. 4f diagrammatically depicts a sixth stage of a line up cycle.
Figure 5A:
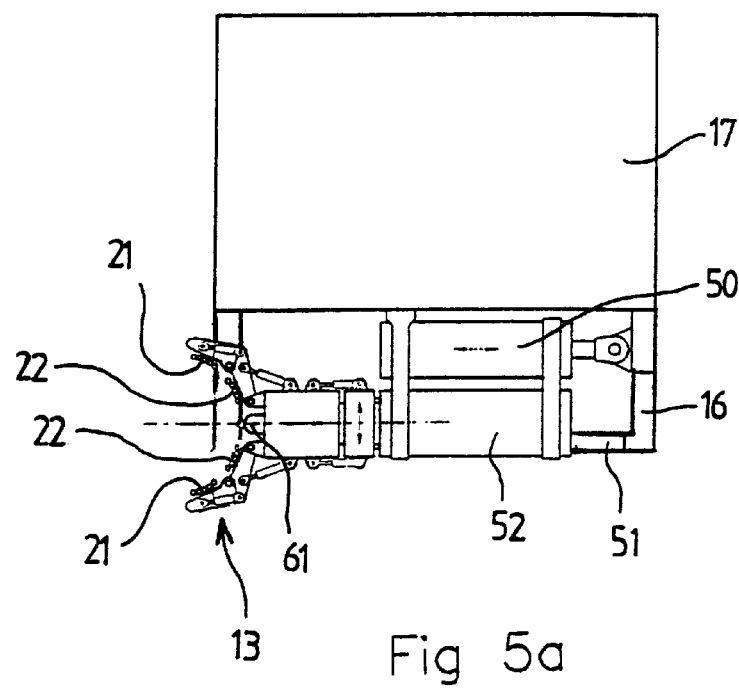
FIG. 5a shows a plan view of an embodiment of a second gripper means of the line up device in an open position.
Figure 5B:
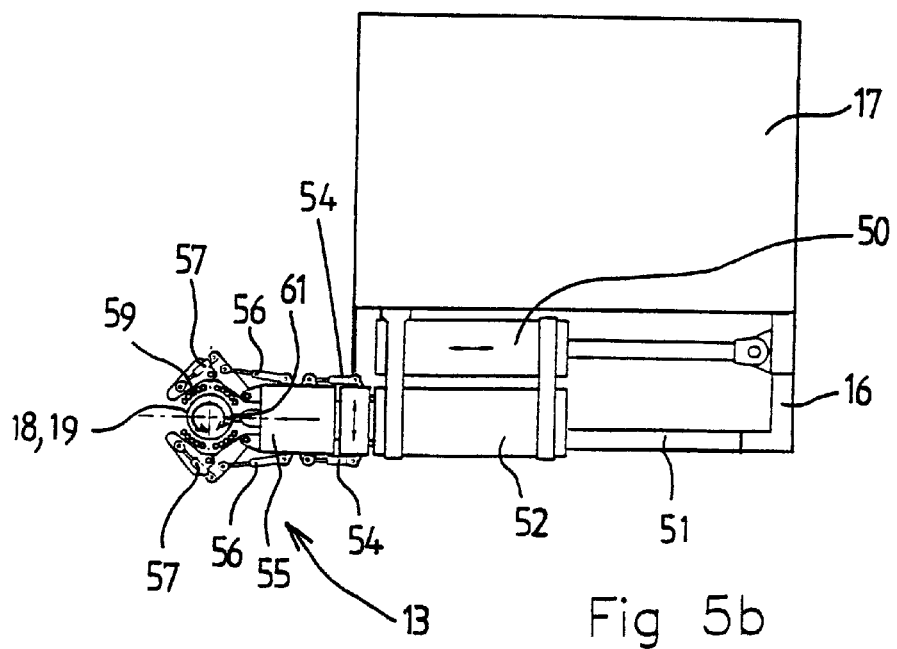
FIG. 5b shows a plan view of the gripper means shown in FIG. 5a in a closed position, with a pipe being gripped by the gripper means.

The way in which the line up device 11 operates will be explained with reference to a preferred embodiment which is shown in FIGS. 3, 5a and 5b and with reference to a diagrammatic illustration of various steps in a line up cycle as shown in FIGS. 4a to 4f. In this specific embodiment, the device 11 comprises first and second gripper means 12, 13 which each have a separate frame 16. The frame 16 is arranged directly on the main frame 17 of the J-lay tower 6. At least second gripper means 13 can move with respect to the main frame 17 in the axial direction of the first pipe, by moving the frame 16, by means of actuators (not shown), in the longitudinal direction of the main frame 17 along guides 20. First gripper means 12 may be designed to be fixed on the main frame, but if appropriate may also be designed to be movable in the axial direction of the first pipe with respect to the main frame 17. The gripper means 12, 13 can be moved in translation in the lateral direction of the first pipe (as indicated by a double arrow in FIGS. 5a and 5b) by means of linear actuators 50. In this case, the gripper means 12, 13 are moved along guides 51 (cf. FIG. 3). The gripper means 12, 13 can be rotated about an axis which is parallel to the guides 51 by means of rotary actuators 52 which are securely attached to the actuators 50 by means of attachment brackets 53.

A head 55 of each of the gripper means 12, 13 can be moved in the lateral direction of the first double-walled pipe by means of actuators 54.

The gripper means 12, 13 each have one or more pairs of clamping jaws. The second gripper means 13 is equipped with a set of shoes (cf. FIGS. 5a and 5b) comprising four shoes 21, 22 which are suitable for gripping pipes of different diameters, with the result that the inner pipe 18 and the outer pipe 19 can be alternately gripped by the gripper means 13, without the shoes having to be changed. The clamping jaws of the gripper means 12, 13 can be moved between an open position (FIG. 5a) and a closed position (FIG. 5b) with the aid of actuators 56 and 57. In the embodiment shown, an inner or outer pipe of a double-walled pipe which has been gripped by the gripper means 12, 13 can rotate about the axial axis of this pipe 3, as indicated by the circular double arrow in FIG. 5b, since each of the shoes comprises a plurality of rollers 59 which can rotate freely about their axial axes.

In the example shown gripper means 12, 13 are each provided with one or more wheels 61 driven by a motor not shown. By means of the wheel 61 the pipe gripped by the gripper means 12, 13 can be rotated via frictional contact. A specific angular position of the pipe can be fixed by blocking the wheel 61. This is relevant if the pipe has a non circular cross-section.

Figure 6:
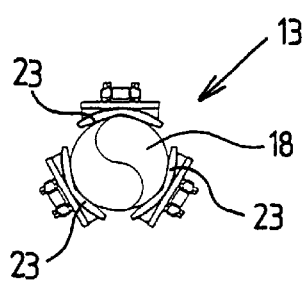
FIG. 6 diagrammatically depicts another embodiment of a gripper means of the line up device.

In an alternative embodiment which is shown in FIG. 6, the gripper means 13 is equipped with three shoes 23 which are V-shaped. There may also be a different number of shoes, in which case a set of shoes comprises at least two shoes. The shape of the shoes may also differ from the embodiments shown here.

As illustrated by FIGS. 4a–4f, a double-walled pipe 3 has been conveyed by the tilting device 5 to the tower 6. The pipe 3 has an inner pipe 18 and an outer pipe 19. The inner and outer pipes 18, 19 are supported by a pipe stop 8. Then, the following steps are carried out:

1) the outer pipe 19 of a first pipe 3 is gripped securely by the first gripper means 12;
2) the inner pipe 18 of the first pipe 3 is gripped securely by the second gripper means 13, after which the tilting device 5 can be tilted away from the tower, resulting in the situation shown in FIG. 4a;
3) the second gripper means 13 with the inner pipe 18 clamped in it is displaced towards the connection station 10, and the end of the inner pipe 18 is lined up with the end of an inner pipe of the suspended pipeline 2 which is situated in the connection station 10;
4) the ends of the inner pipes of the first pipe 3 and the pipeline 2 are connected to one another (cf. FIG. 4b), after which, if appropriate, an insulating layer can be arranged around the inner pipes around the area of the connection;

5) the inner pipe 18 is released by the second gripper means 13 (cf. FIG. 4*c*);

6) the second gripper means 13 is displaced towards the first gripper means 12 (cf. FIG. 4*b*);

7) the outer pipe 19 is gripped securely by the second gripper means 13;

8) the outer pipe 19 is released by the first gripper means 12, resulting in the situation as shown in FIG. 4*e*;

9) the second gripper means 13 together with the outer pipe 19 is displaced towards the connection station 10;

10) the outer pipe 19 is gripped securely by the first gripper means 12, resulting in the situation shown in FIG. 4*f*;

11) the end of the outer pipe 19 is lined up with the end of an outer pipe of the suspended pipeline 2 which is situated in the connection station 10;

12) the ends of the outer pipes of the first pipe 3 and the suspended pipeline 2 are connected to one another.

Figure 5C:
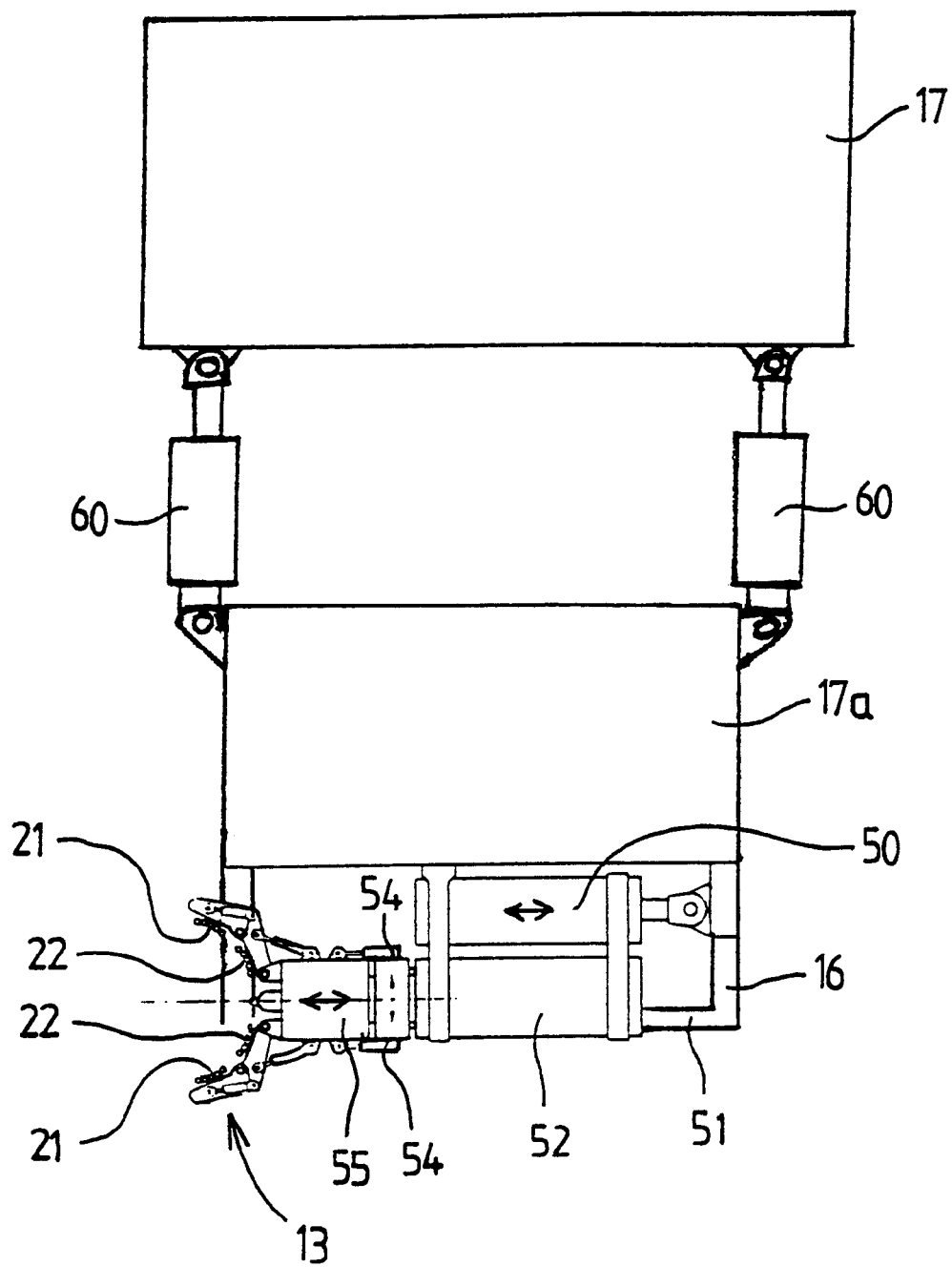
FIG. 5c shows a plan view of a second embodiment of a line up device.

In the embodiment shown (cf. FIG. 3), at least the second gripper means 13 can move along the main frame 17 via a guide 20. However, in another embodiment (cf. FIG. 5*c*), it is also possible for the gripper means 12, 13 to be arranged on a line up frame 17*a* which is arranged on the main frame 17 of the tower 6. On account of the view shown, only the second gripper means 13 can be seen in FIG. 5*c*, but the first gripper means 12 is arranged in a similar way on the line up frame 17*a*, axially above the second gripper means 13. The line up frame 17*a* can be moved with respect to the main frame 17 in the axial and transverse directions of the first pipe 3 by means of actuators 60. At least the second gripper means 13 can be moved in the axial direction of the first pipe, along guides, with respect to the line up frame 17*a*, in a similar manner to that illustrated in FIG. 3.

Figure 7:
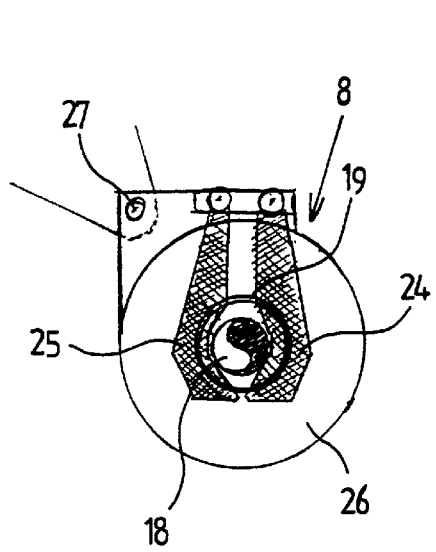
FIGS. 7 and 8 respectively show a plan view and a side view of a first embodiment of a pipe stop.
Figure 8:
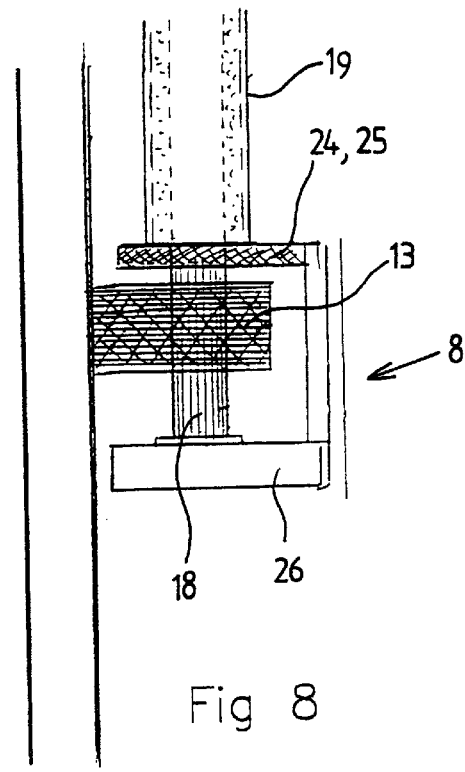

FIG. 7 and FIG. 8 show a pipe stop assembly 8 as shown in FIG. 2. It can be seen from these figures that the inner pipe 18 is supported on a stop 26. The outer pipe 19 is resting on a stop which comprises two stop halves 24, 25 which can be moved away from one another in order to allow the pipe stop assembly 8 to move away from the pipe when the gripper means 12, 13 of the line up device have securely clamped the outer pipe 19 and the inner pipe 18. The stop assembly 8 can be rotated away, about pivot point 27, in a plane which is perpendicular to the axial direction of the pipe, after the pipe has been gripped securely by the gripper means 12, 13.

Figure 9:
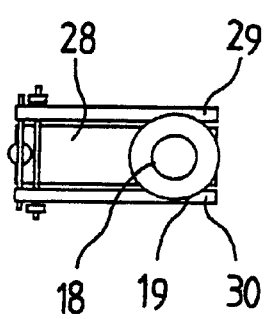
FIGS. 9 and 10 respectively show a plan view and a side view of a second embodiment of a pipe stop.
Figure 10:
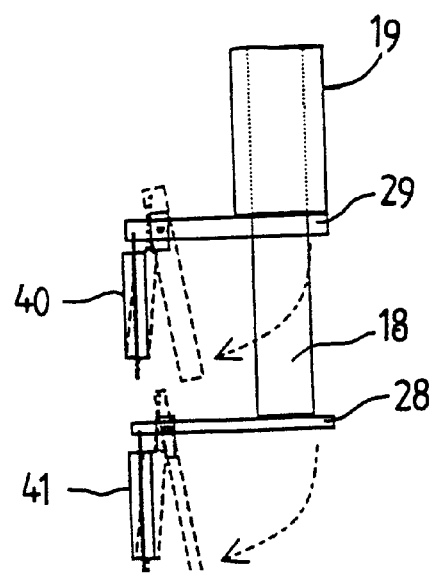

Another embodiment of a pipe stop assembly is shown in FIG. 9 and FIG. 10. The inner pipe 18 is supported by stop 28. The outer pipe 19 is supported by a stop which is formed by two parallel limbs 29, 30. The stops 28, 29, 30 can be rotated away towards the axial direction of the pipe with the aid of piston-cylinder units 40, 41 after the gripper means have gripped the pipe securely, as indicated in FIG. 10.

The line up device described above is suitable for lining up double-walled pipes, but it will be clear that the device is also suitable for lining up single pipes and pipe components.

What is claimed is:

1. A line up and connection installation comprising an elongated pipe receiving structure, a line up device for lining up pipes or pipe components and a connection station for connecting the lined up pipes or pipe components, the line up device comprising at least two gripper means which lie at a distance from one another in the axial direction of the pipe receiving structure, for the purpose of securely gripping a pipe or pipe component, the gripper means each being movable in translation in a plane which lies substantially perpendicular to the axial direction of the pipe receiving structure, and at least one of the gripper means being movable in the axial direction of the pipe receiving structure, the line up device positioning a first pipe or component in such a manner with respect to a second pipe or component that they can be connected to one another at their ends in a connection station, wherein at least one of the gripper means, which can be displaced in the axial direction of the pipe, is designed to alternately grip an inner pipe and an outer pipe of a double-walled pipe.

2. The installation according to claim 1, wherein the gripper means has moveable clamping jaws, being equipped with adjustable sets of shoes for securely gripping pipes of different diameters.

3. The installation according to claim 2, wherein a set of shoes comprises at least two separate shoes, between which pipes having a diameter which lies between a predetermined minimum diameter and a predetermined maximum diameter can be clamped.

4. The installation according to claim 1, wherein the gripper means has moveable clamping jaws designed to be equipped with different sets of shoes for securely gripping pipes of different diameters.

5. The installation according to claim 4, wherein a set of shoes comprises at least two separate shoes, between which pipes having a diameter which lies between a predetermined minimum diameter and a predetermined maximum diameter can be clamped.

6. The installation according to claim 1, wherein the gripper means are arranged movably on a line up frame which is connected to a main frame of the pipe receiving structure.

7. The installation according to claim 6, wherein the line up frame can be moved in at least one direction with respect to the main frame, by means of actuators.

8. The installation according to claim 1, wherein the gripper means are arranged movably on a main frame of the pipe receiving structure.

9. The installation according to claim 1, provided with a tilting device for transporting a pipe to the pipe receiving structure, said tilting device is provided with a pipe stop assembly which supports one end of both the inner pipe and the outer pipe in a position other than the horizontal position, for the purpose of fixing the pipe during transport.

10. A pipe laying vessel provided with an installation according to claim 1.

11. A method for lining up a first double-walled pipe and a second double-walled pipe with respect to one another and connecting them, each double-walled pipe comprising an inner pipe and an outer pipe, using a line up and connection installation comprising an elongated pipe receiving structure, a line up device for lining up pipes or pipe components and a connection station for connecting the lined up pipes or pipe components, the line up device comprising at least two gripper means, at least the following steps being executed:

1) the outer pipe of the first double-walled pipe is gripped securely by a first gripper means;

2) the inner pipe of the first double-walled pipe is gripped securely by a second gripper means;

3) the second gripper means together with the inner pipe of the first double-walled pipe is displaced towards the connection station and one end of the said inner pipe is lined up with one end of an inner pipe of the second double-walled pipe, which is situated in the connection station;

4) the ends of the inner pipes of the first and second double-walled pipes are connected to one another;
5) the inner pipe of the first double-walled pipe is released by the second gripper means;
6) the second gripper means is displaced towards the first gripper means;
7) the outer pipe of the first double-walled pipe is gripped securely by the second gripper means;
8) the said outer pipe is released by the first gripper means;
9) the second gripper means together with the said outer pipe is displaced towards the connection installation;
10) the said outer pipe is gripped securely by the first gripper means;
11) one end of the said outer pipe is lined up with one end of an outer pipe of the second double-walled pipe, which is situated in the connection station;
12) the ends of the outer pipes of the first and second double-walled pipes are connected to one another.

* * * * *